(12) United States Patent
Boutros et al.

(10) Patent No.: US 7,957,494 B2
(45) Date of Patent: *Jun. 7, 2011

(54) COARSE TIMING SYNCHRONIZATION

(75) Inventors: Joseph Boutros, St. Mande (FR);
Emmanuel Lemois, Paris (FR)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/570,772

(22) Filed: Sep. 30, 2009

(65) Prior Publication Data

US 2010/0111236 A1    May 6, 2010

Related U.S. Application Data

(63) Continuation of application No. 11/560,528, filed on Nov. 16, 2006, now Pat. No. 7,616,717, which is a continuation of application No. 09/974,093, filed on Oct. 10, 2001, now Pat. No. 7,154,967.

(30) Foreign Application Priority Data

Feb. 26, 2001 (EP) .................... 01400494

(51) Int. Cl.
*H04B 1/707* (2011.01)
*H04B 3/00* (2006.01)

(52) U.S. Cl. ......... 375/343; 375/142; 375/150; 375/257

(58) Field of Classification Search .............. 375/142, 375/150, 355, 371, 369, 368, 343; 370/342, 370/320, 252

See application file for complete search history.

(56) References Cited

U.S. PATENT DOCUMENTS

| | | | |
|---|---|---|---|
| 5,276,706 A | 1/1994 | Critchlow | |
| 5,761,211 A | 6/1998 | Yamaguchi et al. | |
| 5,870,438 A | 2/1999 | Olafsson | |
| 6,134,286 A | 10/2000 | Chennakeshu et al. | |
| 6,693,882 B1 | 2/2004 | Gu et al. | |
| 6,788,669 B1 | 9/2004 | Takano et al. | |
| 7,050,419 B2 | 5/2006 | Azenkot et al. | |
| 7,154,967 B2 | 12/2006 | Boutros et al. | |

FOREIGN PATENT DOCUMENTS

| | | |
|---|---|---|
| DE | 19609504 A1 | 3/1996 |
| EP | 0429 991 A2 | 11/1990 |
| EP | 0551803 A1 | 12/1992 |
| EP | 1 045 533 A1 | 10/2000 |
| FR | 2493646 | 10/1980 |
| GB | 2315 198 A | 1/1998 |
| JP | 5-37511 | 2/1993 |
| WO | WO 93/07690 | 4/1993 |
| WO | WO 97/24819 | 7/1997 |

OTHER PUBLICATIONS

Co-pending U.S. Appl. No. 11/560,528, filed Nov. 16, 2006; Joseph Boutros et al., entitled "Coarse Timing Synchronization". European Patent Office, European Search Report, European Application No. 01400494.9, Mar. 6, 2002, Branch at the Hague Search division.

*Primary Examiner* — Kevin Y Kim
(74) *Attorney, Agent, or Firm* — Harrity & Harrity, LLP

(57) ABSTRACT

A system for determining the burst start timing of a signal includes logic configured to receive the signal, generate correlation moduli and generate a first timing output based on the correlation moduli. The logic may also be configured to receive operating mode information and timing information and generate search controls. The logic may be further configured to identify a maximum of the correlation moduli using the search controls and determine a second timing output associated with the maximum correlation modulus. The second timing output represents a more accurate approximation of a burst start time than the first timing output.

15 Claims, 7 Drawing Sheets

COARSE TIMING SYNCHRONIZATION

CROSS REFERENCE TO RELATED APPLICATIONS

This application is a continuation of U.S. patent application Ser. No. 11/560,528 filed Nov. 16, 2006, which is a continuation of U.S. patent application Ser. No. 09/974,093 filed Oct. 10, 2001 (now U.S. Pat. No. 7,154,967), the disclosures of which are incorporated herein by reference. This application also claims priority to the following international patent application: European Application No. 01400494.9, entitled "METHODS AND APPARATUS FOR EFFICIENT AND ACCURATE COARSE TIMING SYNCHRONIZATION IN BURST DEMODULATORS," Joseph Boutros et al., filed Feb. 26, 2001.

BACKGROUND

FIGS. 1A and 1B illustrate a prior-art Hybrid Fiber-Coax (HFC) cable system 100 that is compatible with the cable industry standard Data over Cable System Interface Specification (DOCSIS) for providing Internet access to selected cable customers via so called Cable Modems (CMs). FIG. 1A is a top-level view of the cable system. FIG. 1B provides additional detail of the Customer Premises Equipment (CPE) of FIG. 1A. In FIG. 1B, CM 4000 provides a computer industry standard Ethernet interface to PC 5000 and bridges the Ethernet interface with the coax distribution of the cable system. CM 4000 implements both an RF Modulator and an RF Demodulator. These circuits enable digital TDMA burst-modulated communications over dynamically manager upstream and downstream RF channels and in accordance with the DOCIS standard.

An RF Modulator 3000 and RF Demodulator 1000, complementary to those of the cable modem, are implemented in a DOCSIS compatible Cable Modem Termination System (CMTS) 500, which as the name implies, provides termination for the Cable Modem of the CPE. Multiple instances of Modulator 3000 and Demodulator 1000 are provisioned to support those customers having CM service. Control, MAC, Framing 2000 bridges all of the provisioned DOCSIS RF interfaces with one or more packet-based networks. These packet networks may include local area networks, intranets, and the Internet. While FIG. 1A shows the CMTS 500 implemented in a Head End or Primary Hub, theoretically it is possible to implement the CMTS anywhere upstream from the CM. Each demodulator 1000 provides outputs to the Control, MAC, Framing 2000 that include Detected Symbols 1200, and more generally, other status and control signals.

FIG. 2A provides a general conceptual block diagram of the digital burst Demodulator 1000 in the CMTS 500. Front-End 600 isolates one modulated carrier from the carrier multiplex in the Received Spectrum 1100, baseband converts the signal, and passes the resulting signal 1105 to the Burst and Timing Synchronization circuit 1500. (In other contexts the Front-End 600 might be considered as a function prior to, and not part of, the demodulator.) The Recovered Signal Samples 1106, at the output of circuit 1500, are discrete signal samples at the symbol rate (or a multiple thereof). Equalizer 1600 compensates for signal distortion not compensated by the pre-equalizer in the cable modem (CM) and also suppresses ingress noise. At the output of this stage, the Equalized Signal Samples 1107 are not synchronized in terms of carrier phase. This is the task of the Rotator 1700 and Phase Estimator 1900 that follow the Equalizer 1600. Detector 1800 subsequently outputs Detected Symbols 1200.

In burst demodulator applications, such as for the CMTS, the information is conveyed via bursts of symbols. The demodulator must first detect and then decode the bursts. In contrast to analog demodulators, the decode functions are not linear analog circuits that operate continuously, but rather are digital clocked circuits that must be synchronized with the incoming symbols in order to operate. Yet, the symbols are sent asynchronously, in the sense that there is no common clock reference for both the CM and the CMTS. The Burst and Timing Synchronization 1500 of FIG. 2A provides the required burst detection and synchronization and is thus critical to the operation of the demodulator.

The synchronization circuitry 1500 may be further partitioned into coarse timing synchronization and fine timing synchronization. This next level of detail is conceptually illustrated in FIG. 2B. Coarse timing synchronization is also referred to as burst synchronization. Fine timing synchronization is also referred to as symbol timing synchronization or symbol timing recovery.

The role of the coarse timing circuitry is to establish the burst timing to an uncertainty of less than T/2 (0.5 symbol period). The coarse timing circuitry provides the burst timing to the fine timing circuitry and generally to other circuits in the demodulator. Neither the fine timing synchronization, nor the subsequent phase and frequency recovery processes, can be utilized prior to a burst start being detected, as these processes need to be coarse-synchronized with the corresponding CM (for which the demodulator has been provisioned). The role of the fine timing synchronization circuitry is to provide the exact sampling phase necessary for low error rate symbol detection.

In CMTS applications, the coarse timing circuitry must contend with system operation under normal data traffic conditions (traffic mode) and during so-called ranging periods (ranging mode). Ranging is a process by which the CMTS manages the allocation and usage density of time-slots for each of multiple CMs generally assigned to each upstream channel. More specifically, the CMTS uses ranging periods to ascertain the round-trip delay for a specific CM and to subsequently command that CM to operate with a corresponding transmit time-offset. Ranging is performed whenever a CM is initialized and registered by the network and whenever the CMTS suspects that time-slot integrity may have been lost. The ranging calibration process is performed for every CM on the channel and enables the system to smoothly operate at high effective throughput during traffic mode. During subsequent traffic mode operation, from the perspective of the CMTS, the CMs transmit upstream data bursts within their assigned time-slots as though they were all located at a uniform and zero distance from the CMTS.

Ranging periods represent the most problematic operating condition for the CMTS, as the coarse timing circuitry has to reliably (but not falsely) detect bursts that may (or may not) arrive with a huge timing uncertainty (typically up to 3 ms). During traffic mode, the CM is operating with a time slot and delay compensating transmit time-offset, both assigned (and known) by the CMTS as discussed above. Accordingly, the burst timing uncertainty in traffic mode is reduced to time-offset correction errors (typically no greater than 1.1 symbol periods).

As indicated by the switch in FIG. 2B, the coarse timing synchronization circuitry is operated differently in the two operating modes. During ranging, the burst timing is effectively unknown and burst detection is required to initiate frame synchronization. During traffic mode, burst detection is not utilized, and the frame synchronization is initiated using the CMTS's knowledge of the burst timing, gained during the prior ranging period.

Burst detection must be as sensitive as possible, so that demodulation of valid bursts is able to start with the shortest possible delay. Delay in signaling the detection of a valid burst may result in the loss of initial symbols of the burst and more generally requires increased demodulator complexity to prevent or minimize such losses. Moreover, the coarse timing circuitry must have the ability of to reliably distinguish between received noise and received symbol bursts. Two separate error probability indicators characterize this ability. The Nondetection Probability, or Pnd, is the probability that an actually transmitted burst will not be detected. The False Alarm Probability, or Pfa, is the probability of declaring that there is a burst when no burst is actually transmitted. Clearly, smaller error probabilities are better. Pnd must be low and Pfa must be very small.

The time necessary for a CM to become registered by the network during a ranging opportunity is a key concern, as the system must systematically ensure that the CM is detected and demodulated. The mean registration time depends of the probability Pnd, which depends on both the modem performance and the collision probability.

A common method of determining the coarse timing of the start of a ranging burst is the use of power estimation. This is the method shown in FIG. 2B. Generally, this approach performs a long signal integration to estimate the received signal power and compares this estimated power to a predetermined threshold to ascertain if more than thermal noise is present on the channel's carrier frequency. Unfortunately, this method has a number of problems.

Because power estimation bases burst detection on comparing the estimated power with a predetermined threshold, it is undesirably sensitive to power level (i.e., signal-strength) variations associated with different operating conditions (such as variations in attenuation attributable to variations in path lengths). Furthermore, its operation may be compromised by power variations local to the receiver, such as those attributable to the automatic gain control (AGC) of the preceding stages.

Estimation of the received signal power is performed by integrating the instantaneous signal power over a given time window. The integration time (i.e., the duration of the integration window) is a carefully chosen compromise that impacts several key aspects of demodulator performance. Increasing the integration time beneficially reduces the contribution of noise-induced errors in the final power estimate. Unfortunately, increasing the integration time detrimentally increases burst detection latency and reduces the slope of the estimated power function. Increasing burst detection latency requires devoting a larger portion of each burst transmission to the overhead associated with detecting the start of the burst. This increased overhead decreases the effective transmission rate on the upstream channel.

Reducing the slope of the estimated power function reduces the accuracy with which the burst start may be detected. As a consequence, power estimation alone does not deliver a sufficiently accurate indication of burst timing for use in direct synchronization of other demodulator synchronization processes. Some manner of complementary (additional) timing estimation (such as frame synchronization, discussed next) must be relied upon to establish the burst timing with sufficient accuracy to be used as the basis for beginning the other synchronizations.

The frame synchronization circuitry handles smaller timing uncertainties than are required of burst detection. Frame synchronization is always used in traffic mode, and as illustrated, it also may be used in ranging mode to complement (assist) burst detection. The frame synchronization is often implemented by correlation of the received signal with a known preamble. The preamble is specifically chosen such that the position of the first symbol of the burst corresponds to a maximum of the correlation modulus. Typically, some form of time-indexed history buffer retains the most recent correlation moduli. Searching the history buffer within a time window delimited by the power estimation circuitry identifies the correlation maximum.

An approach is needed to burst detection that is superior to power estimation. A burst detection approach is needed that can reliably distinguish between received noise and symbol bursts, with low Pnd and very small Pfa. A burst detection approach is needed that has minimal latency and high accuracy, preferably within T/2, where T denotes the symbol period. (I.e., the reported location of the start of the burst is accurate within one-half symbol period of the actual start of the burst). A burst detection approach is needed that is sensitive to small power transitions, but has reduced dependence on variations in signal level associated with different operating conditions, and is not compromised by local AGC operation. A burst detection approach is needed that minimizes hardware and overall implementation complexity.

BRIEF DESCRIPTION OF DRAWINGS

FIG. 1A is a top-level view of the cable system. FIG. 1B provides additional detail of the CPE of FIG. 1A.

SUMMARY

Figure 1A:
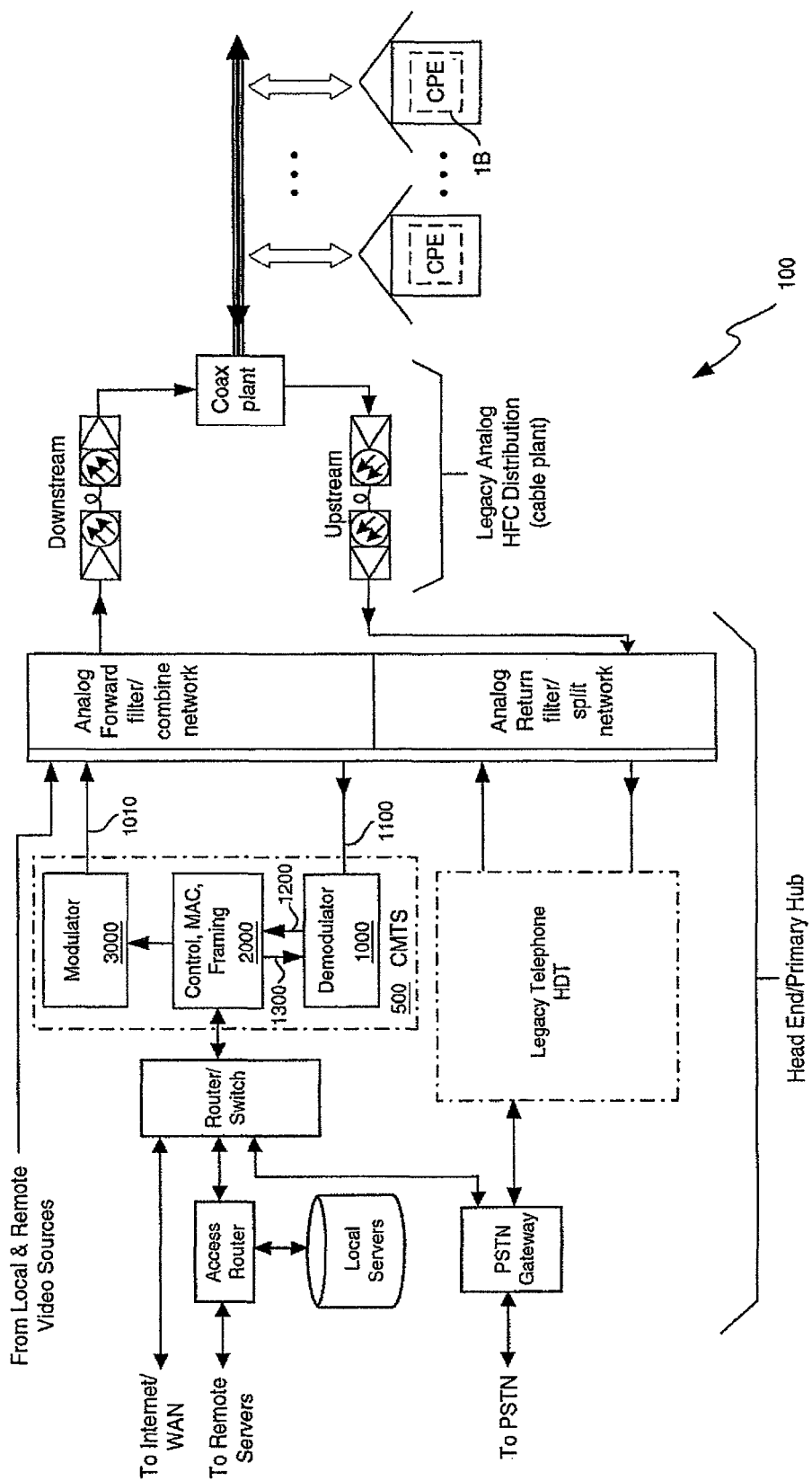
FIGS. 1A and 1B illustrate a prior-art HFC cable system.
Figure 1B:
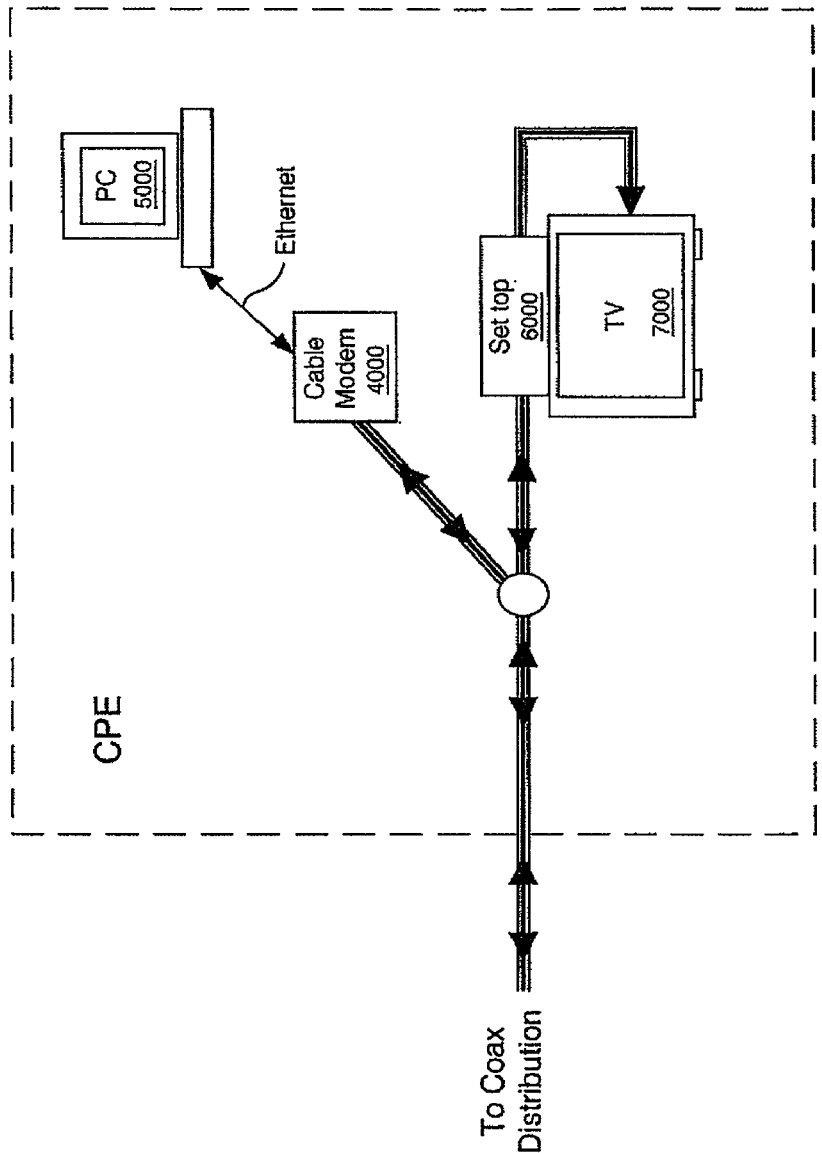

Aspects described herein provide improved accuracy for determining the coarse timing of the start of data bursts (e.g., as received by burst-demodulators). Burst detection with high accuracy (within one-quarter of a symbol period, T/4, in an illustrative embodiment) may be achieved together with good sensitivity, reduced dependence on signal strength, reduced susceptibility to local AGC operation, low error probabilities, very low latency, and a highly efficient use of hardware. Aspects described herein may use a combination of selectively chosen autocorrelation sequences, rejection of signal level induced autocorrelation variations, and parabolic interpolation.

In accordance with an exemplary implementation, the burst detection process is based on an evaluation of correlation moduli. More specifically, autocorrelation may be performed on the isolated and baseband converted received signal using a preamble-embedded correlation sequence selected to provide desired autocorrelation properties. In particular, the correlation sequence may be chosen such that a steeply sloped peak characterizes the autocorrelation time-domain response to the passing of a received preamble with the embedded sequence. In an illustrative but not limiting embodiment, a sequence from the Constant Amplitude Zero Auto-Correlation (CAZAC) family of sequences is used.

A number of hardware efficiencies may be realized in the correlation stage associated with a first exemplary implementation. First, it does not require a prior burst detection stage (in contrast to prior art correlation stages used for frame synchronization). Second, the same correlations that are used to detect the burst start in ranging mode are preferably also used for the frame synchronization in the traffic mode. Furthermore, the autocorrelation circuit is preferably used multiple times per clock period (by sequential operation in separate sub-multiple phases of the clock) to provide a level of accuracy that would otherwise require a corresponding multiple of autocorrelation circuits.

In an exemplary implementation, the autocorrelation output may be fed to both a contrast detection function and a correlation maximization function. For use in ranging mode, the contrast detection generates a metric (referred to as the contrast ratio) by evaluating the current correlation modulus relative to adjacent correlation moduli in a manner (defined by a specific contrast function, $C(t)$) that is sensitive to burst-start signal level transitions, but is insensitive to power level (i.e., signal-strength) variability associated with different operating conditions. When the contrast ratio exceeds a chosen threshold, the contrast detection signals an intermediate burst indication to the correlation maximization function.

In an exemplary implementation, the correlation maximization function includes a time-indexed history buffer that includes the most recent samples of the autocorrelation output. Either the burst indication from the contrast detection function (when in ranging mode), or a priori burst timing knowledge from the CMTS (when in traffic mode) may be used to define a time window within the history buffer and to initiate the search for the autocorrelation maximum within the window. For example, a search, bounded by the time window, may be made for the maximum autocorrelation modulus. The time associated with the correlation maximum is the approximate time of the start of the burst. Burst-start indications so identified by the search are accurate within the sub-clock multiple associated with the autocorrelation results (one-half of a symbol period, T/2, in the illustrative embodiment). Parabolic interpolation may also be subsequently applied to deliver an overall burst-start indication with additional accuracy (within one-quarter of a symbol period, T/4, in the illustrative embodiment).

DETAILED DESCRIPTION

Figure 2A:
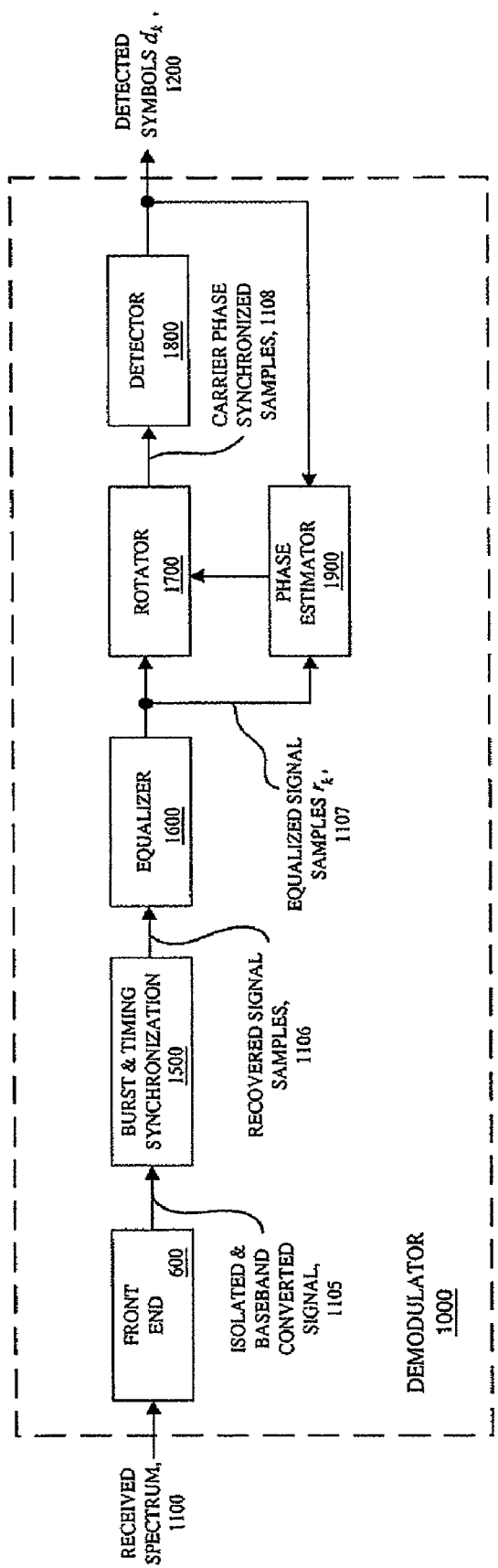
FIG. 2A provides internal architectural detail of Demodulator 1000 of FIG. 1A.
Figure 2B:
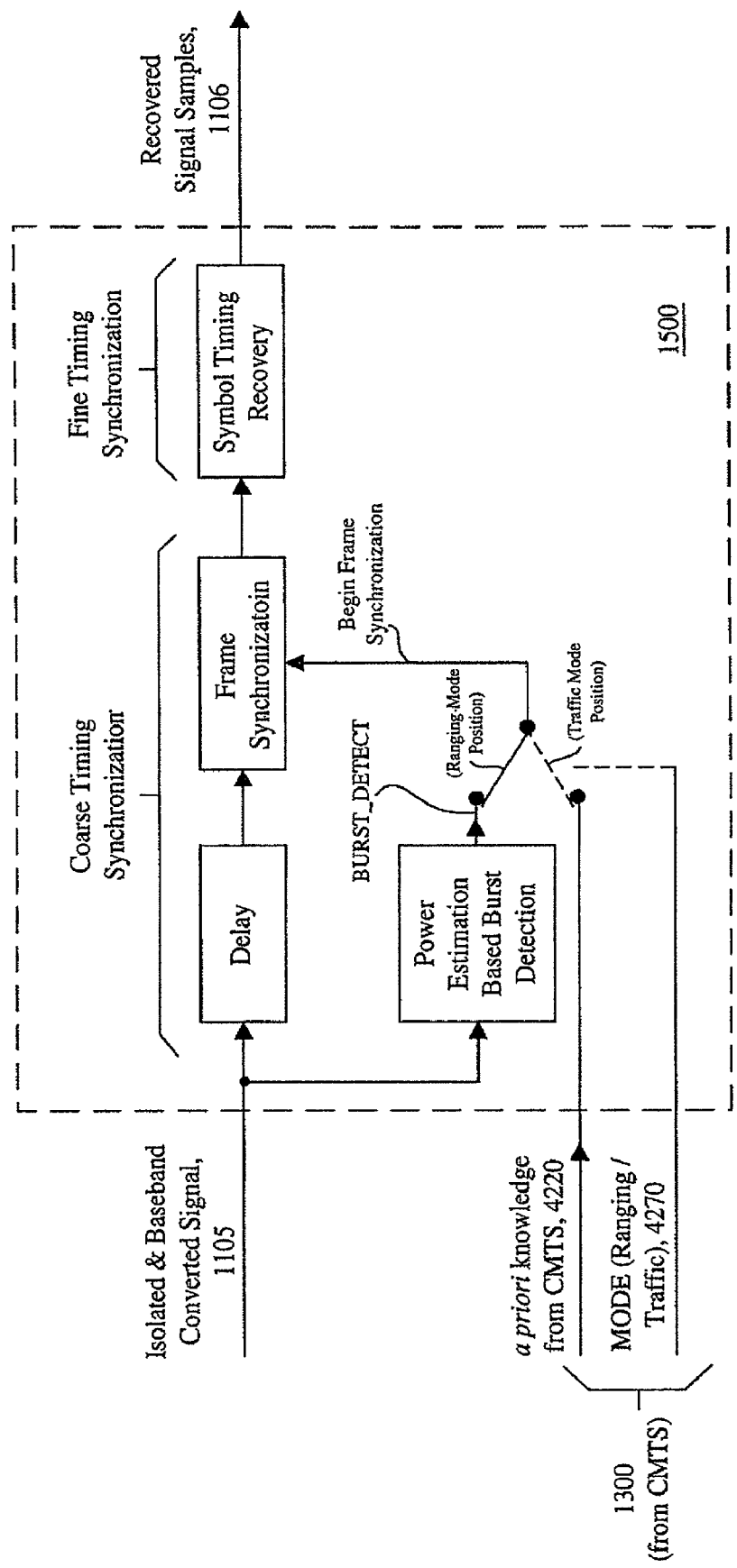
FIG. 2B provides detail of a prior art implementation of the Burst and Timing Synchronization 1500 of FIG. 2A.

The present invention is applicable to a variety of burst detection applications. In an illustrative but not limiting embodiment, the Coarse Timing Synchronization block 1550 of the present invention finds particular application in the system environment previously defined by the high level functionality of the Burst Timing and Synchronization block 1500 of FIG. 2A, but as further detailed by FIG. 3, instead of FIG. 2B. In the Burst Timing and Synchronization block 1500 of FIG. 3, Fine Timing Synchronization 1580 is preferably implemented using the well-known Meyr Algorithm 1570. It is also preferable to include in the implementation the Optional Channel Estimation 1585 and Optional Power Estimation and Scaling 1590.

Figure 3:
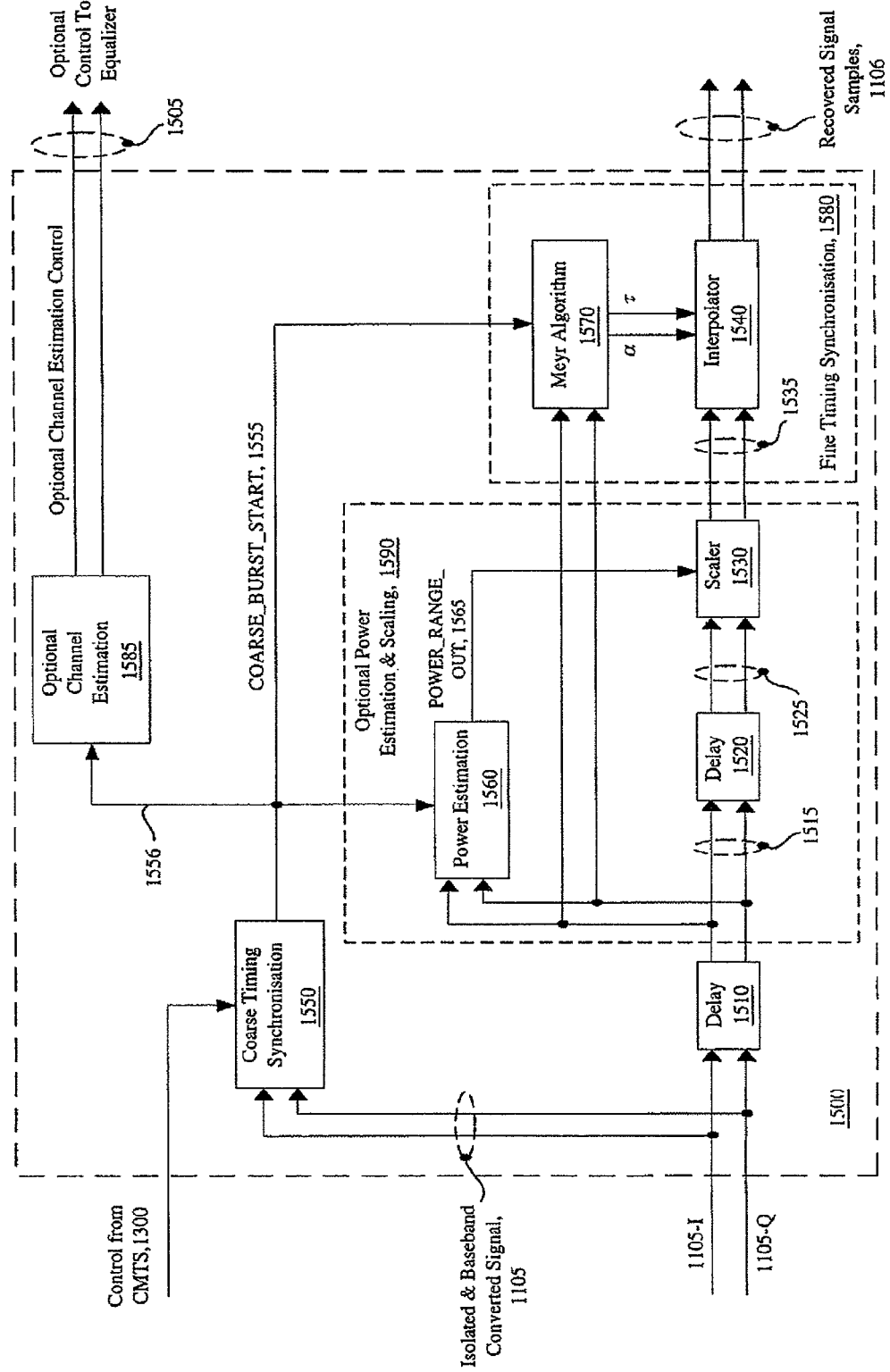
FIG. 3 provides detail of an illustrative implementation of the Burst and Timing Synchronization 1500 of FIG. 2A, providing additional system context for the present invention.
Figure 4:
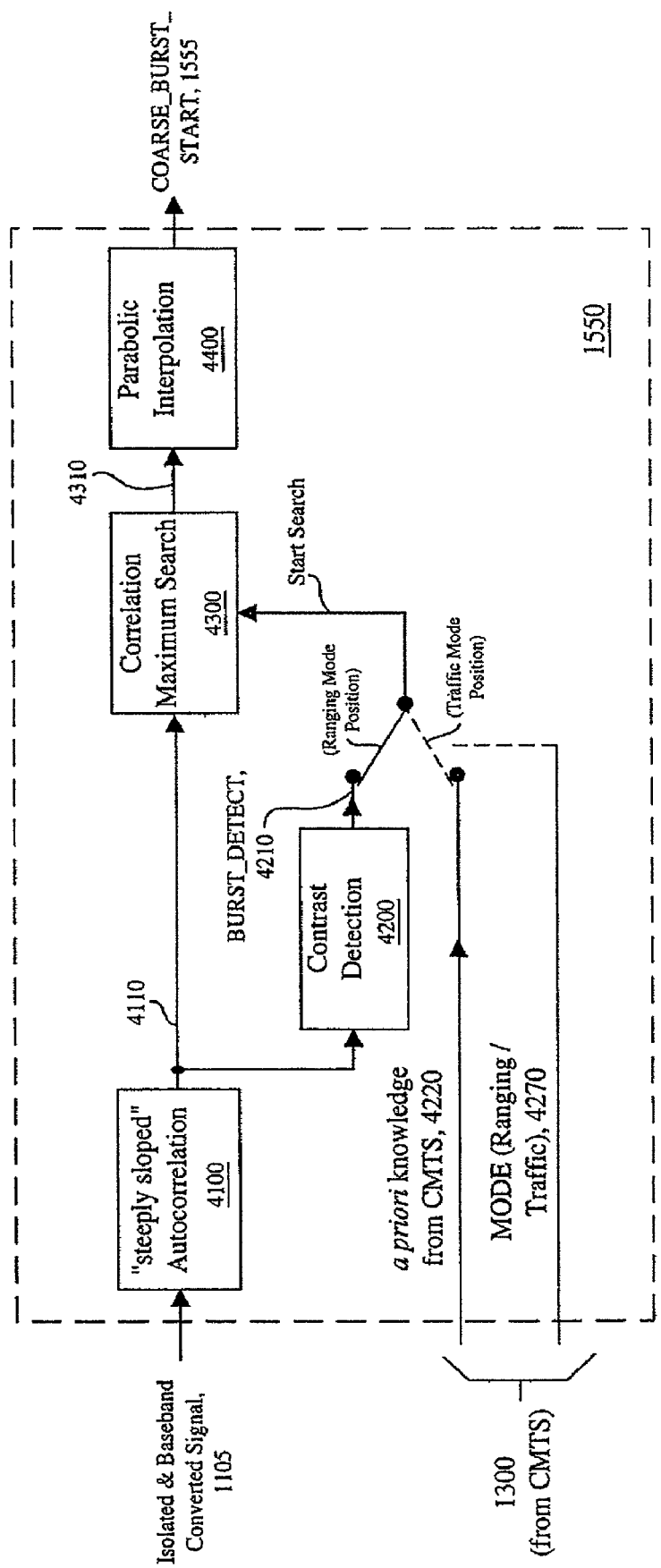
FIG. 4 is a conceptual block diagram of the Coarse Timing Synchronization block 1550 of FIG. 3, at a first level of detail.

FIG. 4 is a conceptual block diagram of the Coarse Timing Synchronization block 1550 of FIG. 3, at a first level of detail, in accordance with the present invention. As introduced previously and discussed in detail later below, an autocorrelation circuit 4100 is used in conjunction with a selected sequence embedded in the preamble, such that the time domain response of the autocorrelation output 4110 has a steeply sloped peak (i.e., steeply sloped level transitions) in response to the reception of the selected sequence. The autocorrelation moduli (the samples on 4110) are passed both to Contrast Detection 4200 and Correlation Maximum Search 4300.

The Contrast Detection 4200 uses a contrast function (detailed later below) to evaluate whether a burst has been observed. The contrast function is sensitive to received signal transitions attributable to the onset of a burst while insensitive to variations in the level of the received signal attributable to different operating conditions. Upon deciding that a burst has been detected, Contrast Detection 4200 activates the BURST_DETECT 4210.

The Correlation Maximum Search 4300 retains a running (constantly updated) collection of recent correlation moduli. Based on the a priori knowledge by the CMTS (4220) of the burst timing, or upon receipt of the BURST_DETECT signal 4210, the Correlation Maximum Search 4300 starts a search to identify the correlation maximum, which is output at 4310. Whether the a priori knowledge or the BURST_DETECT is used, is determined as illustrated, in accordance with MODE 4270. The search window size should correspond to the extent of time uncertainty for the search and is selected also based on the system mode (i.e., ranging vs. traffic; as indicated by MODE 4270), and more generally on functional configuration (e.g., baud rate), and other system constraints. The time associated with the correlation maximum is the approximate time of the start of the burst. Parabolic Interpolation 4400 is further used to increase the accuracy of the final burst detection output, COARSE_BURST_START 1555.

Figure 5:
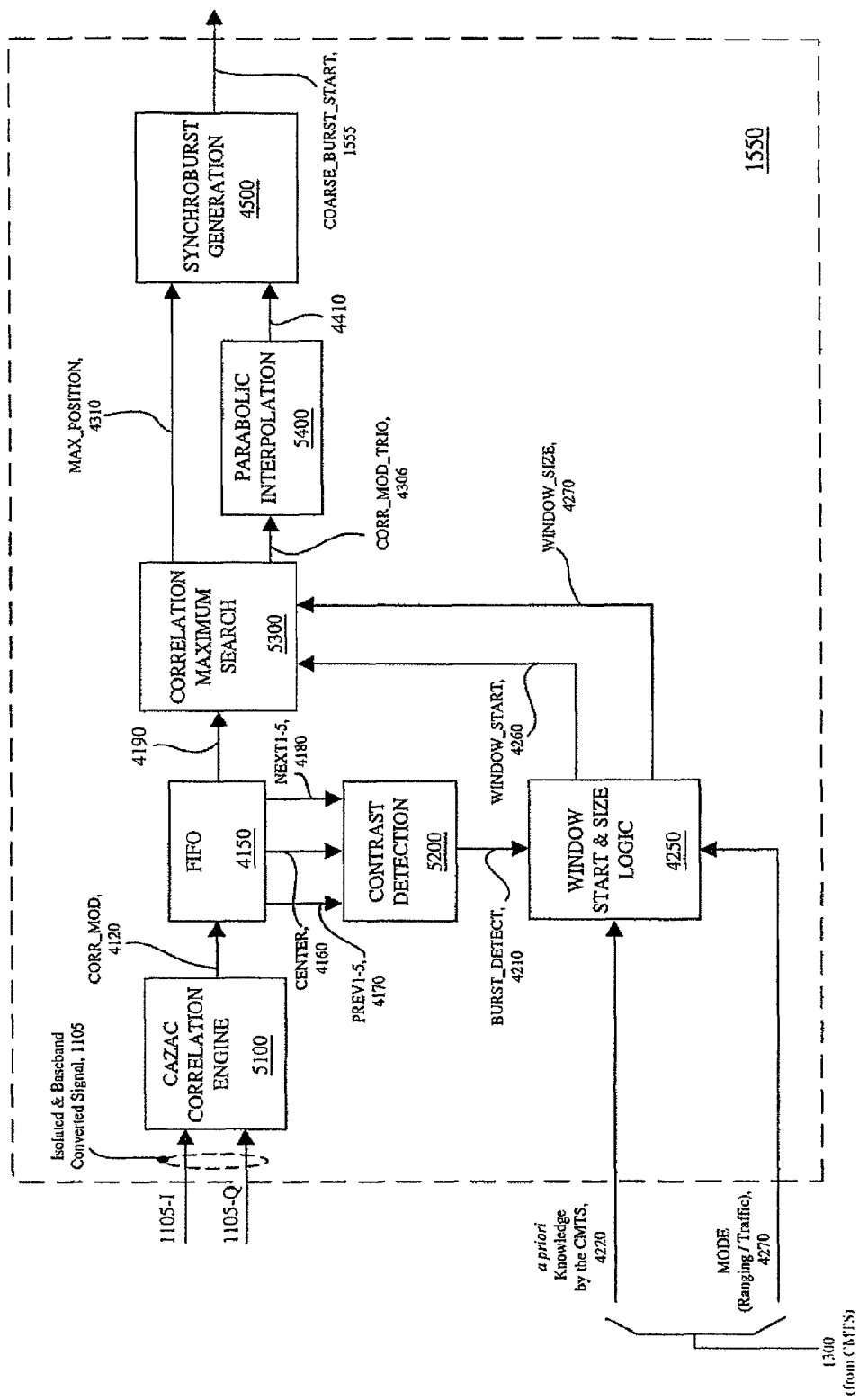
FIG. 5 provides detail of an illustrative implementation of the Coarse Timing Synchronization 1550 of FIG. 4.

FIG. 5 is an illustrative implementation of the Coarse Timing Synchronization block 1550 of FIG. 3, providing additional detail of the invention. The Steeply Sloped Autocorrelation function of FIG. 4 is referred to here as CAZAC Correlation Engine (5100). It computes the autocorrelation of the quadrature signal pair 1105 (output from the receiver front-end) and provides samples on CORR_MOD 4120 to FIFO 4150. As discussed in the background, operation switches repeatedly between the Ranging mode and the Traffic mode under control of the CMTS via the MODE 4270 signal. In the Traffic mode, the burst start position is known with an uncertainty of +1.1 symbol periods for the highest baud rate. In the Ranging mode, the burst start position is known with a large uncertainty (typically 3 ms).

In the present invention, Window Start & Size Logic 4250 sets the position of the burst start-time uncertainty-window in accordance with the different conditions encountered in these two modes. In the Ranging mode, the window start is controlled by the BURST_DETECT (4210) delivered by the Contrast Detection circuit (4200). The window size must be sufficiently large to compensate for the uncertainty due to limitations in the contrast detection function. In the Traffic mode, the window start is controlled by the a priori knowledge of the CM timing offset. This knowledge was obtained by the CMTS during a previous ranging operation. The window size in this mode must be sufficiently large to compensate for the uncertainty of the timing offset, due to limitations in the ranging process.

CAZAC Correlation Algorithm

In the illustrative embodiment it is assumed that the preamble of the received bursts contains a 26-symbol sequence in accordance with the Constant Amplitude Zero Auto-Correlation (CAZAC) family of sequences. (The invention is not restricted to sequences from the CAZAC family. Other sequence families that provide similar steeply sloped autocorrelation responses will also suffice.) The symbols preferably take two opposite values (antipodal signals) chosen in the QPSK or the 16-QAM constellations, but other choices are also possible. The 26-symbol CAZAC sequence is derived from an original 16-symbol sequence by appending the first 5 symbols at its end and copying the last 5 symbols at the beginning.

$$\text{Let } R_{xx}^{Periodic}(\tau) = \sum_{i=0}^{L\_CORR-1} x_i^* x(i-\tau) \text{mod} L\_CORR$$

denote the periodic autocorrelation function of the 16-symbol CAZAC sequence, where the variable (tau) is an integer. L_CORR stands for the Correlation length, which is equal to 16. The symbols $x_i$ of the sequence, i=16 . . . 16, are chosen such that:

$$R_{xx}^{Periodic}(0) = 32,$$

and $$R_{xx}^{Periodic}(\tau) = 0.0$$

for $\tau = -5 \ldots +5$ and $\tau \neq 0$

The CAZAC Correlation Engine 5100 computes a scalar product (also called correlation) between the 16 symbols $x_i$ of the CAZAC sequence and samples $r(t+i \times T_s)$ extracted from the received signal. Notice that the samples $r(t+i \times T_s)$ are separated by a symbol period $T_s$. The evaluated scalar product is:

$$R_{rx}(t, \tau) = \sum_{i=1}^{16} r(t + (i-\tau)T_s)x_i^*$$

Note that $R_{rx}(t,\tau)=R_{rx}(t-\tau \times T_s,0)$, it shall be derived from $R_{rx}(t,0)$.

As a preferred approach in the illustrative embodiment, to guarantee an uncertainty interval less than $T_s/2$, the correlation is computed twice per symbol period, i.e. the scalar product $R_{rx}(t,0)$ is evaluated for $t=k \times T_s$ and $t=(k+½) \times T_s$, where k is an integer. Thus the CAZAC Correlation Engine 5100 is operated twice per clock period.

Contrast Algorithm

The function of the contrast algorithm is to decide whether or not a burst is present in the received signal. The decision is taken after some signal processing based on the preamble content. To enable this processing, FIFO 4150 holds a moving sequence of 11 correlation moduli, including the "center" modulus 4160, 5 "previous" moduli 4170, and 5 "next" moduli 4180. These moduli are provided to the Contrast Detection 5100 to enable evaluation of the contrast algorithm, described below. An internal flag called BurstFound is set to 1 when the contrast algorithm decides that a burst is present, otherwise this flag is always set to 0.

For a given value of time t, we assume that 2×W+1 (11 in the illustrative embodiment) scalar product values $R_{rx}(t,\tau)$ are available (e.g., from the FIFO), for $\tau$=−W . . . +W. These 2×W+1 correlations are used to get a contrast defined by:

$$C(t) = \frac{|R_{rx}(t, 0)|^2}{\sum_{\tau=-W, \tau \neq 0}^{+W} |R_{rx}(t, \tau)|^2}$$

In a preferred implementation, W is set to 5. Now, fix a given threshold S. The following rule is applied to make a decision:

If C>S then BurstFound=1, otherwise BurstFound=0.

The threshold S is appropriately selected when Pnd and Pfa are low and lead to a low probability of missing a burst.

Correlation Maximization

The Correlation Maximum Search 5300 finds the maximum of the correlation modulus $|R_{rx}(t,\tau)|^2$, within a dynamically determined range around the expected time t. This range is associated with a burst-start time-uncertainty window that is defined in the illustrative embodiment by the Window Start & Size Logic 4250 via Window Start 4260 and Window Size 4270. Delayed correlation moduli 4190 are received from the output from FIFO 4150 and a running (constantly updated) history buffer of these moduli is maintained as required to support the search. In a preferred embodiment, the history buffer is offset counter-indexed, and thereby effectively time-indexed. In the Ranging mode, the search is initiated by an appropriately delayed version of BURST_DETECT 4210, from the Contrast Detection 5200. In the Traffic mode, the search is initiated by an a priori knowledge of the CM timing by the CMTS 4220. Once the correlation maximum is found, the time associated with it is taken to be the approximate time of the start of the burst. The time associated with the correlation maximum is provided (in the form of an offset pointer with resolution to T/2) as MAX_POSITION 4310 to the Synchroburst Generation 4500.

Parabolic Interpolation

The Correlation Maximum Search 5300 provides the Parabolic Interpolation 5400 with the amplitude values of three sequential correlation moduli read from the history buffer: the maximum correlation modulus, the immediately adjacent previous (T/2 earlier in time) correlation modulus, and the immediately adjacent next (T/2 later in time) correlation modulus. In the equation below, CorrModMax, CorrModPrev, and CorrModNext respectively represent these moduli. In FIG. 5, CORR_MOD_TRIO 4306 collectively represents the three moduli.

The Parabolic Interpolation 5400 uses these three moduli to generate a timing offset to further refine the accuracy of the burst start time. The parabolic interpolation timing offset, $\Delta t_{Parinter}$, expressed in symbol periods, is defined by:

$$\Delta t_{Parinter} = \frac{1}{4} \times \frac{CorrMod_{Prev} - CorrMod_{Next}}{CorrMod_{Prev} - 2 \times CorrMod_{Max} + CorrMod_{Next}}$$

This timing offset is appropriately quantified to a predetermined set of allowed time values, which in the illustrative embodiment consist of −(¼×$T_s$), 0, and +(¼×$T_s$), collectively represented by quantified offset 4410.

Synchroburst Generation

Synchroburst Generation 4500 adds the quantified offset 4410 from the Parabolic Interpolation 5400 to the MAX_POSITION 4310 time value and generates COARSE_BURST_START 1555 in a manner that indicates the start of the detected burst with accuracy within T/4.

CONCLUSION

Although the present invention has been described using particular illustrative embodiments, it will be understood that many variations in construction, arrangement and use are possible consistent with the teachings and within the scope of the invention. For example, bit-widths, clock speeds, and the type of technology used may generally be varied in each component block of the invention. Also, unless specifically stated to the contrary, the value ranges specified, the maximum and minimum values used, are merely those of the illustrative or preferred embodiments and should not be construed as limitations of the invention. Certain preferred options used in the illustrative embodiments are not limitations of the invention. Specifically, other embodiments may use different correlations in the ranging and traffic modes. Functionally equivalent techniques known to those skilled in the art may be employed instead of those illustrated to implement various components or sub-systems. For example, the autocorrelation sequence may be chosen from other than the CAZAC family of sequences. The contrast function is not limited to the specific contrast function of the illustrative embodiment. Different approaches may be equivalently used to implement the FIFO functionality for the contrast detection, or the history buffer for the Correlation Maximum Search. All such variations in design comprise insubstantial changes over the teachings conveyed by the illustrative embodiments. The names given to interconnect and logic are illustrative, and should not be construed as limiting the invention. It is also understood that the invention has broad applicability to other communications and network applications, and is not limited to the particular application or industry of the illustrated embodiments. The present invention is thus to be construed as including all possible modifications and variations encompassed within the scope of the appended claims.

We claim:

1. A method comprising:
   receiving, at a network device, a signal;
   generating, at the network device, correlation moduli based on the received signal;
   generating, at the network device, a first timing output based on the generated correlation moduli;
   generating, at the network device, search controls based on the first timing output, information associated with an operating mode of the network device, and prior timing information; and
   generating, at the network device, a second timing output in response to the search controls and based on the correlation moduli, the second timing output representing a more accurate approximation of a burst start time than the first timing output.

2. The method of claim 1, where the generating the search controls includes:
   selecting one of the prior timing information or the first timing output.

3. The method of claim 1, where the search controls include start and size information.

4. The method of claim 1, where the generating correlation moduli occurs multiple times in a clock cycle.

5. The method of claim 1, where the generating correlation moduli includes:
   performing steeply sloped autocorrelation on the received signal.

6. The method of claim 5, where the correlation moduli includes a steeply sloped peak in response to a presence of a predetermined sequence in the received signal.

7. The method of claim 5, where the correlation moduli includes a steeply sloped peak in response to a presence of a predetermined sequence in a preamble of the received signal.

8. The method of claim 5, where the information associated with an operating mode of the network device includes information identifying one of a traffic mode, in which the network device receives data, or a ranging mode, in which the network device performs a ranging operation.

9. A device comprising:
   one or more processors to:
      receive a signal;
      generate correlation moduli based on the received signal;
      generate a first timing output based on the generated correlation moduli;
      generate one or more controls based on the first timing output and information associated with an operating mode of the device;
      generate, in response to the one or more controls, a second timing output based on the correlation moduli, the second timing output representing a more accurate approximation of a burst start time than the first timing output; and
      perform a steeply sloped autocorrelation on the received signal.

10. The device of claim 9, where the correlation moduli includes a steeply sloped peak in response to a presence of a predetermined sequence in the received signal.

11. A device comprising:
    one or more processors to:
       receive a signal;
       generate correlation moduli based on the received signal;
       generate a first timing output based on the generated correlation moduli;
       generate one or more controls based on the first timing output and information associated with an operating mode of the device; and
       generate, in response to the one or more controls, a second timing output based on the correlation moduli, the second timing output representing a more accurate approximation of a burst start time than the first timing output;
       where the information associated with an operating mode of the device includes information identifying one of a traffic mode, in which the device receives data, or a ranging mode, in which the device performs a ranging operation.

12. A device comprising:
    one or more processors to:
       receive a signal;
       generate correlation moduli based on the received signal;
       generate a first timing output based on the generated correlation moduli;
       generate one or more controls based on the first timing output and information associated with an operating mode of the device; and
       generate, in response to the one or more controls, a second timing output based on the correlation moduli, the second timing output representing a more accurate approximation of a burst start time than the first timing output;
       where the device corresponds to a cable modem termination system (CMTS) of a cable network.

13. A method comprising:
receiving, at a network device, a signal;
generating, at the network device and based on the signal, correlation moduli;
generating, at the network device, a first burst start time based on the correlation moduli; and
identifying, at the network device, a maximum correlation modulus of the correlation moduli; and
generating, at the network device, a second burst start time based on the maximum correlation modulus, the second burst start time being more accurate than the first burst start time.

14. The method of claim 13, where the identifying the maximum correlation modulus includes:
identifying the maximum correlation modulus based on an operating mode of the network device, the operating mode including one of a traffic mode, in which the network device receives data, or a ranging mode, in which the network device performs a ranging operation.

15. The method of claim 13, where the correlation moduli includes a steeply sloped peak in response to a presence of a predetermined sequence in a preamble of the received signal.

* * * * *